April 6, 1926.
R. DORSH
WIND MOTOR
Filed Feb. 9, 1924
1,579,440
2 Sheets-Sheet 1
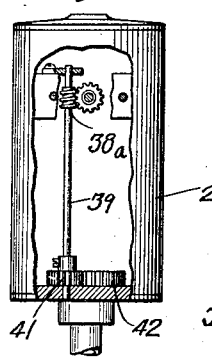
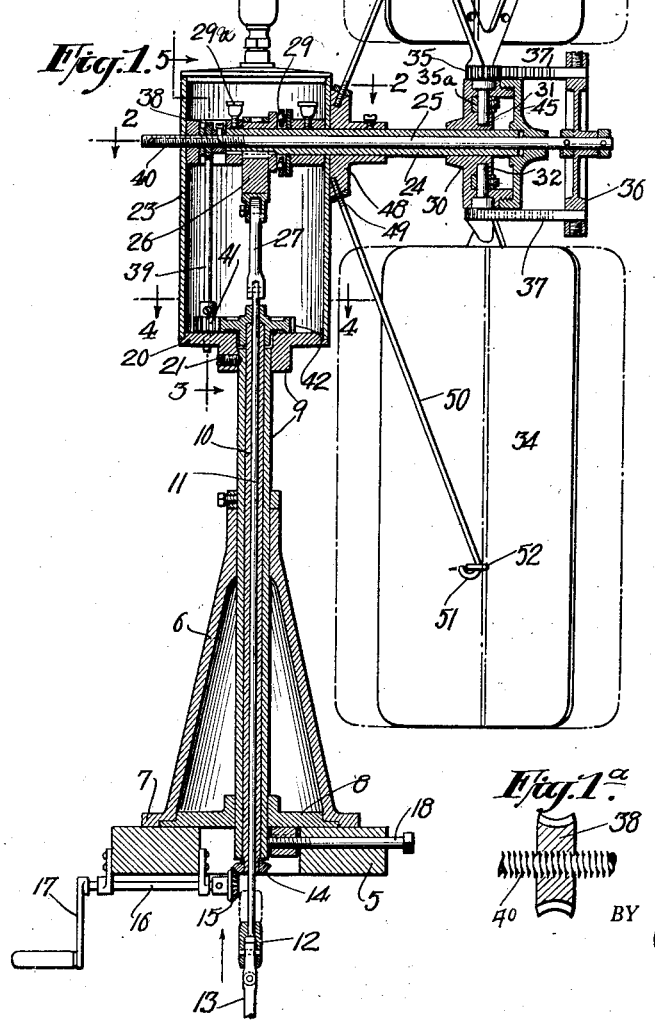
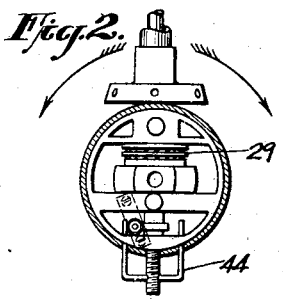
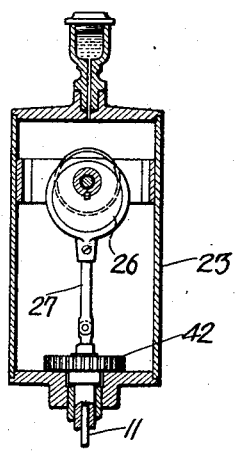
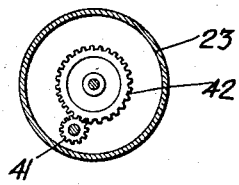
INVENTOR.
RUDOLF DORSH.
BY Richard B. Owen
ATTORNEY.

April 6, 1926.
R. DORSH
WIND MOTOR
Filed Feb. 9, 1924
1,579,440
2 Sheets-Sheet 2
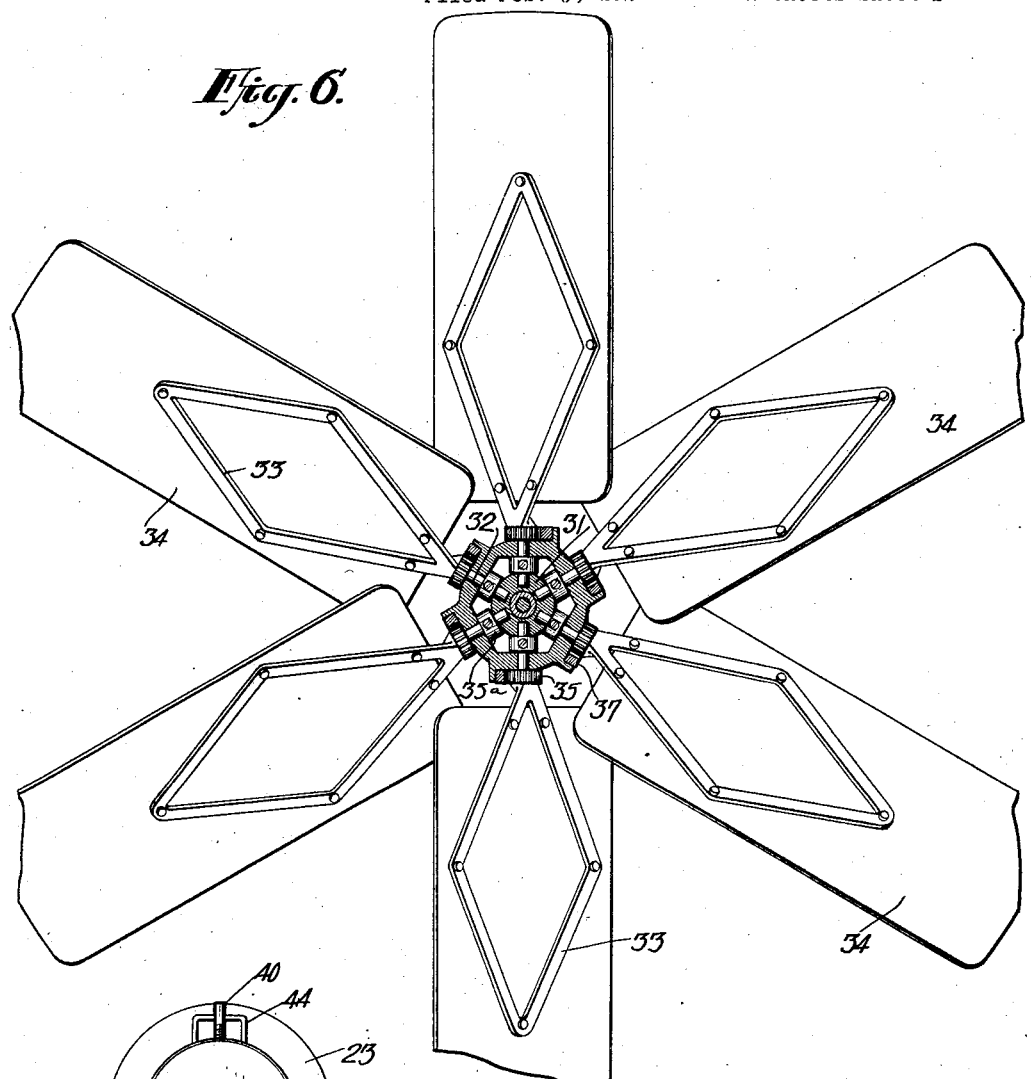
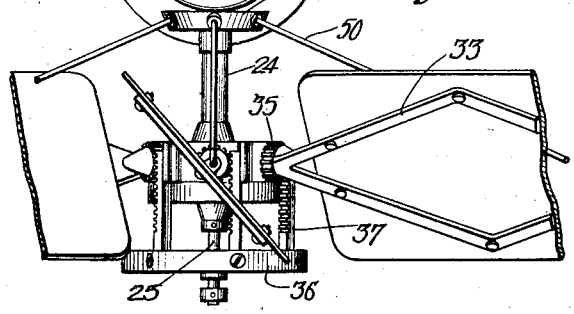
INVENTOR.
RUDOLF DORSH.
BY
ATTORNEY.

Patented Apr. 6, 1926.

1,579,440

UNITED STATES PATENT OFFICE.

RUDOLF DORSH, OF NEW YORK, N. Y.

WIND MOTOR.

Application filed February 9, 1924. Serial No. 691,718.

*To all whom it may concern:*

Be it known that I, RUDOLF DORSH, a citizen of the United States, residing at New York city, in the county of New York and State of New York, have invented certain new and useful Improvements in Wind Motors, of which the following is a specification.

This invention relates to wind motors and more particularly to a novel and improved power generating mechanism for driving machinery and the like especially under conditions where air currents prevail.

One of the objects of my invention is to provide a novel and improved wind motor having a plurality of radial blades including provision for simultaneously angling said blades to increase or decrease the rapidity of rotation and the operation of the shaft connected to the engine or power driven element.

Another object of my invention is to provide a wind motor of the class above described including a plurality of radial vanes including means for rotating said vanes on their axes simultaneously while the engine or power driven element is rotating and without disconnecting any of the mechanism.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a sectional view.

Figure 1a is a detail view showing the adjusting gearing for the horizontal shaft on which the vanes are mounted.

Figure 2 is a sectional view taken substantially on the line 2—2 of Figure 1.

Figure 3 is a sectional view showing the relation of the eccentric through the vertical reciprocating shaft.

Figure 4 is a further section, taken on the line 4—4 of Figure 1.

Figure 5 is a detail view taken on the line 5—5 of Figure 1.

Figure 6 is a rear view of the vanes, the gearing being shown in section.

Figure 7 is a partial plan showing the relation of the adjusting gears for angling the vanes.

Referring now to the drawings wherein like reference characters designate corresponding parts throughout the several views, 60 designates the base or flooring and 6 the conical support preferably in the form of a hollow casting having a flanged bottom 7, rigidly secured or supported on the flooring 5 at a point where the mechanism is to be installed. Extending upwardly through the bottom 8 of the casting, is a sleeve housing 9. A sleeve 10 within the sleeve housing receives a vertical reciprocating shaft 11 of any desired length, the lower end of the said reciprocating shaft being provided with a universal joint 12 for connection to a connecting rod 13, attached to the fly wheel (not shown) or mechanism to be operated and driven. On the lower end of the sleeve 10, the gear 14 is provided which is adapted to mesh with a gear 15, keyed on the shaft 16 and rotated by the operating handle 17 as clearly shown by Figure 1 of the drawings. Under ordinary conditions, the sleeve housing and sleeve may rotate within the conical casting and therefore a threaded lock bolt 18 is provided, whereby the position of the horizontal shaft carrying the vane may be set to obtain the maximum power in the manner set forth below.

The sleeve housing 9 carries an annular plate 20, which is keyed thereto by a screw or other fastening element 21. The vertical reciprocating shaft and its sleeve extends upwardly through the plate 20 and within the cylinder housing 23 mounted on the plate 20 as shown. The cylinder housing 23 supports a horizontal sleeve 24 and shaft 25, said sleeve having an eccentric 26, positioned within the cylinder housing. A connecting arm 27 attached to the upper end of the vertical reciprocating shaft 11 is in turn, connected to the eccentric for communicating power to said shaft and to the mechanism to be driven thereby. Anti-friction bearings 29, oil cups 29a, are also provided to facilitate the operation and to increase the efficiency of the rotation of the sleeve 24 and the mechanism carried thereby.

Keyed to the sleeve 24, I have provided a vane supporting casting 30 formed with a collar 31. The said casting and its collar is provided with a plurality of radial, aligned openings or apertures, which receive the stub shaft 32 that supports each of the frames 33 to which the vanes 34 are secured. The spacing collars 35ª are interposed between the collar 31 and the casting proper, it being observed particularly, from Figures 6 and 7 that the stub shafts 32 are each formed with a gear 35 whereby the angularity of the vanes 34 may be adjusted as now to be described. Freely movable on the outer end of the shaft 25, I have provided an enlarged disk 36, to which a plurality of rack bars 37 are keyed, the teeth of said rack bars being in engagement with the respective gears or pinions 35 of each of the frames, supporting the vanes. As the disk 36 and the rack bars carried thereby are moved inwardly and outwardly, it will be seen that the vanes may be adjusted from the full line to the dotted line position, as shown by Figure 1, so that a greater surface of the vanes may be presented to the wind so as to increase the rapidity of rotation of the mechanism. The inward and outward movement, therefore, of the disk 36 is controlled through the internally threaded worm gear 38 meshing with the wire wheel 38ª on the short, vertical shaft 39 within the cylinder housing 23. The outer end of the shaft 25 is threaded as indicated at 40, the lower end of the said shaft 39 having a pinion 41 keyed thereto, which is in mesh with a gear 42, mounted on the sleeve 10 so that as the meshed gears 14, 15, are actuated, rotary motion will be imparted to the pinion and gear 41, 42, to operate the worm 38. The shaft 25, however, does not rotate but is supported on the U-shaped follower 44, movable inwardly and outwardly of the cylinder casing 23. It will therefore be seen that the shaft 25 is somewhat in the nature of a feed screw, may be moved inwardly and outwardly so that the disk 36 and the rack bars carried thereby will engage the gears or pinions 35 to angle the vanes. A cover plate 45 is internally threaded to engage the threads of the outer face of the casting 30 to prevent the admission of dirt or foreign matter to the stub shaft supporting the frames and vanes 34. The collar 48 is also mounted on the sleeve 24 and is adapted to receive the threaded ends 49 of a brace rod 50, the opposite end of the brace rod being provided with a hooked end 51 which engages an eye 52 at a point somewhat off the center of the vane so as to permit of the adjustment to the desired position through the vane adjusting mechanism above described. It will thus be seen from the above construction that while the mechanism is free to rotate on a vertical axis, the vane adjusting mechanism is entirely independent and does not in any way affect the operation of the lubricating shaft and the eccentric 26, while the same is being driven.

While I shown a plurality of radial vanes of rectangular configuration, it will be understood that any other type of vane may be utilized for the same purpose and to that end, it will be observed that the rigid frames 33 may also be varied for connection to the desired type of vanes to be used. The use to which the mechanism may be put is also of a varied nature, in that it may be installed on a sailing vessel as well as on a building, and consequently the size and materials entering into the construction as above described are purely relative and may be altered to suit the needs and the occasion.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention, what I claim as new and desire to secure by United States Letters Patent is:—

1. In a wind motor, a vertical sleeve housing having a cylinder housing fixed on the upper end thereof, a vertical sleeve journaled in the sleeve housing and projecting slightly beyond the ends of the latter, means associated with the lower end of the sleeve for facilitating manual turning of the latter, a horizontal sleeve having one end journaled in the upper part of the cylinder housing and having a wind wheel secured on its other end, said wind wheel having axially rotatable radial vanes, a shaft slidable longitudinally in the horizontal sleeve and having one end portion exposed within the cylinder housing and its other end operatively connected to the vanes for causing axial rotation of the latter when said shaft is slid relative to the horizontal sleeve, operative connections in the cylinder housing between the exposed end portion of said shaft and the upper end of the vertical sleeve for effecting sliding of said shaft upon manual rotation of said vertical sleeve, and means within the cylinder housing and extending downwardly through the vertical sleeve for transmitting power from rotation of the horizontal sleeve to desired machinery.

2. In a wind motor, a vertical sleeve housing having a cylinder housing fixed on the upper end thereof, a vertical sleeve journaled in the sleeve housing and projecting slightly beyond the ends of the latter, means associated with the lower end of the sleeve for facilitating manual turning of the latter, a horizontal sleeve having one end journaled in the upper part of a cylinder housing and having a wind wheel secured on its other end, said wind wheel having axially rotatable radial vanes, a shaft slidable longitudinally in the horizontal sleeve and having one end portion exposed within the cylinder housing and its other end operatively connected to the vanes for causing axial rotation of the latter when said shaft is slid relative to the horizontal sleeve, operative connections in the cylinder housing between the exposed end portion of said shaft and the upper end of the vertical sleeve for effecting sliding of said shaft upon manual rotation of said vertical sleeve, and means within the cylinder housing and extending downwardly through the vertical sleeve for transmitting power from rotation of the horizontal sleeve to desired machinery, a support in which said sleeve housing is mounted for axial rotation, and means engageable with the lower end of the sleeve housing for releasably holding the same in any desired rotarily adjusted position.

3. In a wind motor, a vertical sleeve housing having a cylinder housing fixed on the upper end thereof, a vertical sleeve journaled in the sleeve housing and projecting slightly beyond the ends of the latter, means associated with the lower end of the sleeve for facilitating manual turning of the latter, a horizontal sleeve having one end journaled in the upper part of a cylinder housing and having a wind wheel secured on its other end, said wind wheel having axially rotatable radial vanes, a shaft slidable longitudinally in the horizontal sleeve and having one end portion exposed within the cylinder housing and its other end operatively connected to the vanes for causing axial rotation of the latter when said shaft is slid relative to the horizontal sleeve, operative connections in the cylinder housing between the exposed end portion of said shaft and the upper end of the vertical sleeve for effecting sliding of said shaft upon manual rotation of said vertical sleeve, and means within the cylinder housing and extending downwardly through the vertical sleeve for transmitting power from rotation of the horizontal sleeve to desired machinery, said operative connection between the slidable shaft and the vertical sleeve embodying a substantially vertical shaft in the cylinder housing having its lower end rotatably geared to the upper end of the vertical sleeve and a gear having threaded engagement with the exposed portion of the slidable shaft and operatively connected to the upper end of said substantially vertical shaft.

In testimony whereof I affix my signature.

RUDOLF DORSH. [L. S.]